Eastlack & Miller,
Water Gate,
Nº 2,548. Patented Apr. 21, 1842.
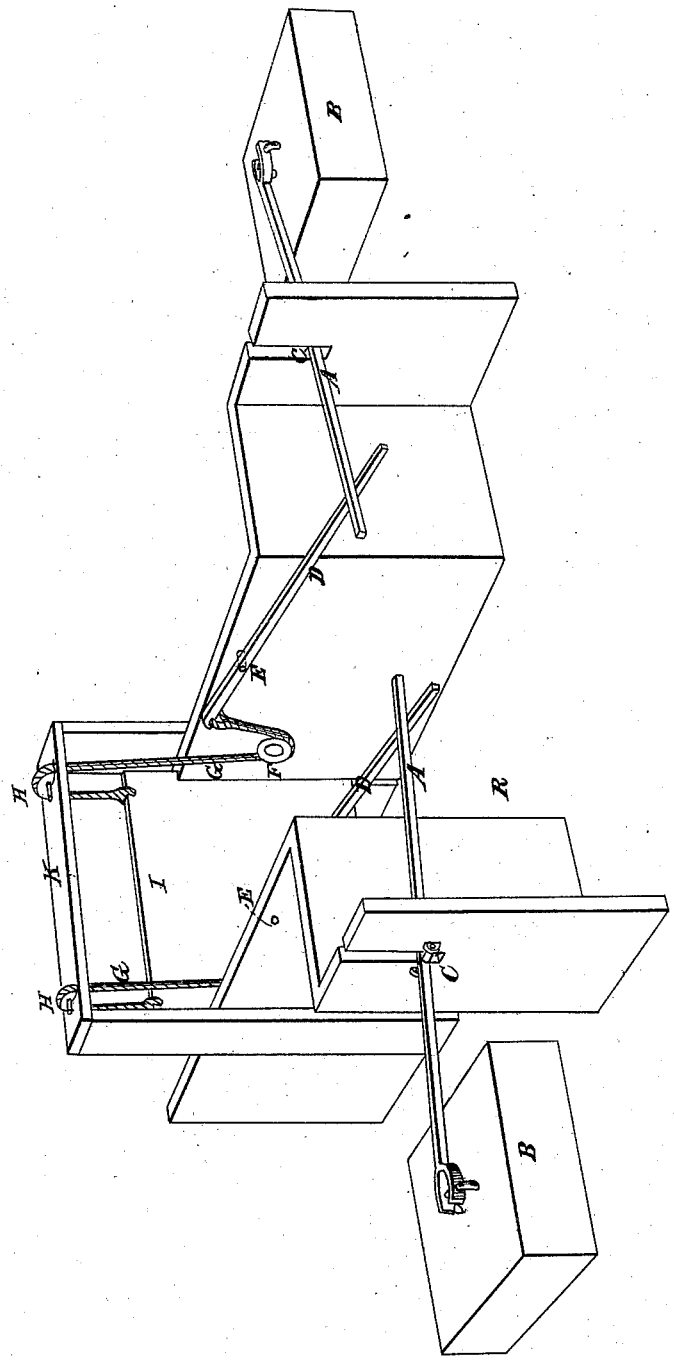

UNITED STATES PATENT OFFICE.

EDWIN EASTLACK AND JOSEPH A. MILLER, OF GREENWICH TOWNSHIP, CUMBERLAND COUNTY, NEW JERSEY.

SELF-ACTING WASTE-GATE.

Specification of Letters Patent No. 2,578, dated April 21, 1842.

*To all whom it may concern:*

Be it known that we, EDWIN EASTLACK and JOSEPH A. MILLER, of the township of Greenwich, in the county of Cumberland and State of New Jersey, have invented a new and useful Improvement in Waste-Gates to Mill and Other Dams and to Flood-Gates; and we do hereby declare that the following is a full and exact description thereof, reference being had to the annexed drawings of the same, making part of this specification.

The nature of our invention consists in applying a combination of buoys and levers, cords and pulleys, to waste and flood gates in such a manner that the rise of the water over a medium or desired height shall raise the gates and let the water escape and thus prevent an overflow or breaking of the dams or banks.

Figure 1 is a perspective view of the race, waste gate, cords, pulleys, levers, and buoys.

Our improvement is described as follows: Two buoys B, B of buoyancy proportioned to the weight of the gate to be raised are placed along the edge of the mill pond or on opposite sides of the outlet or water course or mill race. These buoys are attached by common links and staples to the outer ends of levers A A which levers work in mortises at the tops of the posts C C planted firmly in the ground. The other or inner ends of the lever A A pass over the ends of levers D D at right angles thereto. The levers D are placed over the race parallel to it and rest on fulcra E supported by the frame work on sides of the mill race or in any convenient manner. The other ends of said levers D are attached to the cords G G which pass around or under the pulleys F and upward over pulleys H and down to the waste gate I to which they are attached, as shown in the drawing. The pulleys F F turn on studs inserted in the sides of the race and the pulleys H turn on pins supported by a frame K over the waste gate I.

Operation: When the pond is at ordinary height the buoys are so hung as to leave the gates at the required height but when the water rises in the pond the buoys rise and lift the outer ends of the levers A A attached to them while the inner ends are pressed down upon the longer arms of the levers D which cause them to rise at the other or short ends attached to the cords G and consequently pull the cords G which raise the gate I thus letting the water escape till reduced to the ordinary level when the gate again descends to its usual position by the descent of the buoys.

We do not claim as our invention the principle of governing gates by floats;

But what we do claim as our invention, and which we desire to secure by Letters Patent, is—

The particular arrangement of the levers A, D, in combination with the buoys B B, pulleys F H, cords G G, and gate I for the purpose herein specified.

EDWIN EASTLACK.
     JOSEPH A. MILLER.

Witnesses:
 ENOCH MULFORD,
 SHEPPARD WESTCOTT.